July 15, 1952    J. W. DUTY    2,603,026
LIVE FISHING BAIT AND HOOK HOLDER
Filed March 25, 1949

Inventor
Jacob W. Duty

By John N. Randolph
Attorney

Patented July 15, 1952

2,603,026

UNITED STATES PATENT OFFICE 2,603,026

LIVE FISHING BAIT AND HOOK HOLDER

Jacob W. Duty, Warrensville, Pa.

Application March 25, 1949, Serial No. 83,390

1 Claim. (Cl. 43—44.2)

This invention relates to a fishing rig adapted for attachment to a leader and to be used for supporting live bait such as a minnow on the end of the leader and for maintaining the live bait in a very natural position to simulate the bait as it will normally appear while swimming.

More particularly, it is an aim of the present invention to provide a live bait supporting rig on which a live bait, such as a minnow, can be mounted and to which a hook is connected for positioning the hook adjacent the tail of the bait to eliminate the loss of fish due to fish striking the tail of the bait rearwardly of the hook as frequently occurs where live bait are attached to a fishhook by being hooked through the head.

Another object of the invention is to provide a holder for live bait which will prevent the bait from sliding relatively to the hook and being curved by the hook to assume an unnatural position and appearance in the water and a curved position which acts similar to a propeller to cause the bait to spin in an unnatural manner when drawn through the water.

Another object of the invention is to provide a live bait holder of extremely simple construction and of sufficiently small size that the holder will be disposed entirely within the bait, when in an operative position.

Another object of the invention is to provide a holder which will retain the head of the live bait in a position so that when it is pulled through the water the tendency to assume an unnatural appearance or to spin will be reduced to a minimum.

Various other objects and advantages of the invention will hereinafter become more fully apparent from the following description of the drawing, illustrating preferred embodiments thereof, and wherein.

Figure 1:
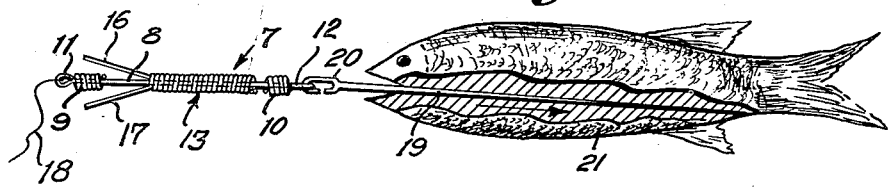
Figure 1 is a side elevational view showing the bait holder in its initial position being applied to a live bait.

Referring more specifically to the drawing, and first with reference to the embodiment thereof as illustrated in Figures 1 to 4, the live bait holder, as therein disclosed, is designated generally 7 and includes an elongated body portion 8 which is preferably formed from a strand of relatively stiff wire but which could be formed of any other suitable material. The terminals of the body member or strand 8 are turned back and wound about said strand to provide coils or windings 9 at one end of the body 8 and coils or windings 10 adjacent the opposite end thereof and which form an eye 11 at said first mentioned end and an eye 12 at the last mentioned end. The eye 11 constitutes the forward end of the body 8 and the eye 12 the trailing or rear end thereof. It will be readily obvious that the eyes 11 and 12 could be formed in any other desired manner at the ends of the body member 8.

Figure 2:
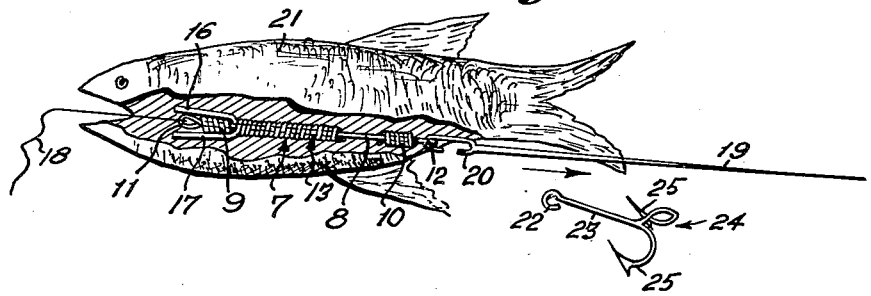
Figure 2 is a similar view showing the holder in a partially applied position.
Figure 3:
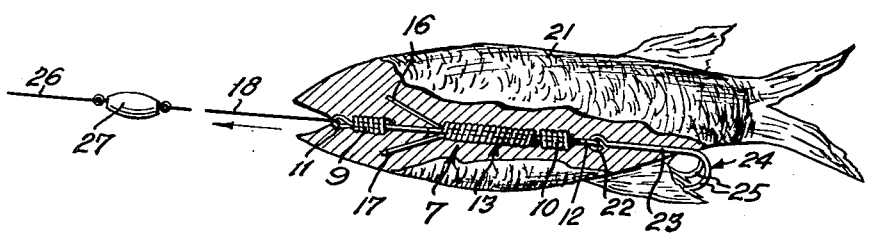
Figure 3 is a view similar to Figures 1 and 2 but showing the bait holder in a fully applied position for use and with a hook attached thereto.
Figure 4:
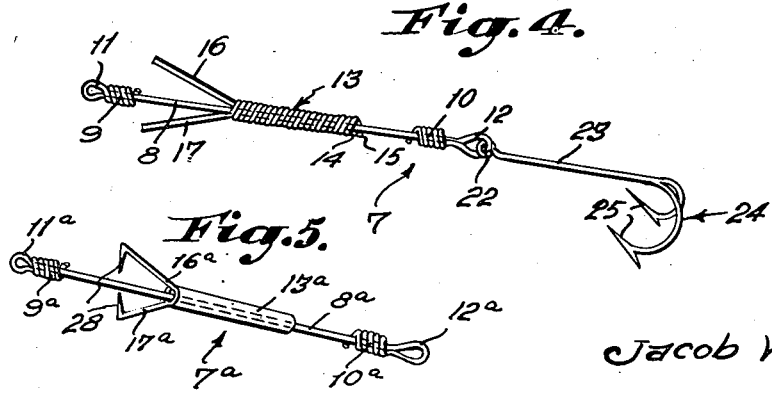
Figure 4 is an enlarged side elevational view of the bait holder with the hook attached.

An elongated tubular member or the like 13 is slidably mounted on the body member 8 between the coils or windings 9 and 10 which form stops for limiting the sliding movement of the member 13 on said member 8. In the form of Figures 1 to 4, the member 13 is formed by two strands of wire or the like, designated 14 and 15, as best illustrated in Figure 4, which are wound in closely coiled convolutions spirally about the rod or body member 8 and which have complementary ends 16 and 17, disposed adjacent the eye 11 which are not wound on the body 8 and which project in forwardly diverging relationship from the forward end of said tubular member 13. The strands 14 and 15 possess sufficient resiliency so that the forwardly projecting prongs 16 and 17 which are disposed in forwardly diverging relationship, as illustrated in Figures 1 and 4, will yield into substantially parallel relationship, as seen in Figure 2, while the holder 7 is being applied and will thereafter spring back to their forwardly diverging relationship.

The live bait holder 7 is particularly adapted for use with minnows but may be applied to any other live bait fish. To apply the holder 7, after a leader 18 has been attached to the forward eye 11, an ordinary needle 19, the eye 20 of which has been split to enable the needle eye to engage the trailing eye 12, is interengaged with said eye 12, as illustrated in Figures 1 and 2. The needle 19, which constitutes no part of the present invention, is then passed longitudinally through the body of a bait fish such as a minnow 21, being inserted through the mouth and passing outwardly of the bait 21 near the anal fin, as illustrated in Figures 1 and 2. The holder 7 is thus drawn longitudinally into the live bait 21 through the mouth and is drawn rearwardly through the body of the bait fish, as seen in Figure 2 until the rear holder eye 12 is exposed beneath and adjacent the anal fin. When thus drawing the holder 7 longitudinally and rearwardly through the bait 21, the prongs 16 and 17 are caused to yield toward the body 8 to substantially assume the positions of Figure 2 and the tubular portion 13 slides forwardly on the body or rod 8 until its forward motion is stopped by engagement of the prongs 16 and 17 with the wrapping 9, as seen in Figure 2. When the rear holder eye 12 is exposed at the under part and near the tail of the bait 21, the needle 19 is disconnected from said eye 12 and the open eye 22 at the forward end of a hook shank 23 is then attached to said rear holder eye 12. The hook shank 23 constitutes a part of one conventional type of fishhook, designated generally 24 having a bifurcated or double hook trailing end, each of which barb hooks is indicated at 25. However, it will be readily apparent that a conventional fishhook with a single barbed hook portion could be used in lieu of the double barb hook 24 as illustrated. After the open eye 22 has been engaged with the rear holder eye 12 the leader 18 is pulled outwardly of the mouth of the bait fish 21 to cause the body 8 of the holder 7 to slide forwardly in the bait fish from its position of Figure 2 to its position of Figure 3. As this occurs, the wrapping 9 will move out of engagement with the prongs 16 and 17 which will tend to yield away from one another and back toward their normal positions of Figures 1 and 4. Further forward movement of the body 8 will cause the rear wrapping 10 to engage the rear end of the tubular member 13. When this occurs and the member 13 is displaced forwardly of the bait fish 21 with the body 8, its initial forward movement will cause the prongs 16 and 17 to embed themselves in the bait fish and spring apart and assume the positions of Figure 3 to thereby anchor the holder 7 in the bait 21 and with the rear eye 12 of the holder disposed, as seen in Figure 3, so that the hook shank 23 will be contained within the body of the bait 21 and the barb hooks 25 will be disposed in close proximity to and beneath the bait body 21 and adjacent the tail. When the fishhook 24 is thus disposed, as seen in Figure 3, the holder 7 in its applied and operative position of this figure will be entirely contained within the body of the bait 21 and will be anchored by the prongs 16 and 17 to prevent it from being displaced forwardly of the bait 21. The prongs 16 and 17 will also function to hold the bait 21 in a normal position which will simulate the position of the bait fish while swimming and will prevent the bait 21 from sliding either forwardly on the leader 18 away from the hook 24 or rearwardly on to said hook so as to have the tail portion of the bait 21 curved by the hook to assume an unnatural position and wherein the tail of the bait would be curved to act as a propeller or vane for causing the bait to revolve when drawn through the water in trolling or retrieving. The holder 7 by retaining the bait 21 in a normal substantially straight position minimizes the tendency of the bait to revolve in the water and additionally and primarily functions to maintain the fishhook 24 near the tail of the bait 21 so that a fish could not strike and cut off the rear half of the bait 21 without engaging the hook, as frequently occurs when minnows or other live bait are hooked through the head and used for trolling or retrieving. The forward end of the leader 18 is adapted to be connected to an end of a fishing line 26 by a conventional swivel 27 in the usual manner.

Figure 5:
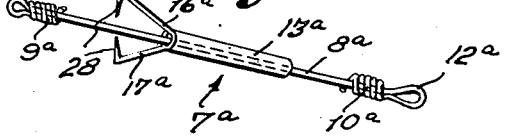
Figure 5 is a view similar to Figure 4, with the hook removed, and showing another form of the invention.

Figure 5 illustrates another embodiment of the live bait holder, designated generally 7a and having a body 8a corresponding to the body or rod 8 including the wrappings 9a and 10a, corresponding to the wrappings 9 and 10, respectively, and which form the eyes 11a and 12a, corresponding to the eyes 11 and 12, respectively. The holder 7a in lieu of the tubular member 13 formed of the coil strands 14 and 15 includes a tube or sleeve 13a which is slidably supported on the rod or body 8a between the wrappings 9a and 10a and which is provided at its forward end with forwardly projecting, forwardly diverging spring prongs 16a and 17a which are suitably secured to or formed integral with the forward end of the sleeve 13a, which is disposed adjacent the wrapping 9a. The prongs 16a and 17a are provided at their forward, free ends with inwardly projecting barbs 28 to assist in additionally anchoring said prongs 16a and 17a in the body of the bait 21. The bait holder 7a is applied in the same manner as the bait holder 7 and assumes the same operative position, as illustrated in Figure 3. A further description of the construction, operation and use of the holder 7a is considered unnecessary in view of the detailed description of the operation and use of the holder 7.

Various other modifications and changes are contemplated and may obviously be resorted to, without departing from the spirit or scope of the invention as hereinafter defined by the appended claim.

I claim as my invention:

A holder for live fish bait comprising an elongated body member having an eye at each end thereof, a supporting member reciprocally disposed on said body member between said eyes and having resilient prongs projecting from one end thereof in normally diverging relationship, said body member comprising a substantially rigid rod or strand having turned back terminals coiled therearound forming said eyes, said terminals constituting stops for limiting the sliding movement of said supporting member, and said supporting member comprising a pair of strands closely coiled around the body member to form a tubular portion for slidable engagement with the body member, corresponding ends of said strands projecting from one end of said tubular portion and forming said prongs.

JACOB W. DUTY.

REFERENCES CITED

The following references are of record in the file of this patent:

UNITED STATES PATENTS

| Number | Name | Date |
| --- | --- | --- |
| 673,087 | Rabbeth | Apr. 30, 1901 |
| 849,036 | Zimmerman | Apr. 2, 1907 |
| 979,891 | Schield | Dec. 27, 1910 |
| 1,152,698 | Bonner | Sept. 7, 1915 |
| 1,215,938 | Jay | Feb. 13, 1917 |
| 1,503,901 | Jones, Jr. | Aug. 5, 1924 |
| 1,717,376 | Ellerbroek | June 18, 1929 |

FOREIGN PATENTS

| Number | Country | Date |
| --- | --- | --- |
| 445,749 | Germany | June 17, 1927 |